United States Patent
Visoz et al.

(10) Patent No.: US 11,968,636 B2
(45) Date of Patent: Apr. 23, 2024

(54) INFORMATION COMMUNICATION METHOD, AND SYSTEM AND DEVICES THEREOF

(71) Applicant: ORANGE, Issy les Moulineaux (FR)

(72) Inventors: Raphaël Visoz, Chatillon (FR); Benoît Graves, Chatillon (FR)

(73) Assignee: ORANGE, Issy les Moulineaux (FR)

( * ) Notice: Subject to any disclaimer, the term of this patent is extended or adjusted under 35 U.S.C. 154(b) by 287 days.

(21) Appl. No.: 17/438,686

(22) PCT Filed: Mar. 6, 2020

(86) PCT No.: PCT/FR2020/050462
§ 371 (c)(1),
(2) Date: Sep. 13, 2021

(87) PCT Pub. No.: WO2020/183096
PCT Pub. Date: Sep. 17, 2020

(65) Prior Publication Data
US 2022/0150850 A1 May 12, 2022

(30) Foreign Application Priority Data
Mar. 11, 2019 (FR) ...................... 1902448

(51) Int. Cl.
*H04W 56/00* (2009.01)
*H04W 36/00* (2009.01)
(Continued)

(52) U.S. Cl.
CPC ..... *H04W 56/001* (2013.01); *H04W 36/0077* (2013.01); *H04W 36/08* (2013.01); *H04W 48/20* (2013.01)

(58) Field of Classification Search
CPC ........... H04W 56/001; H04W 36/0077; H04W 36/08; H04W 48/20
(Continued)

(56) References Cited

U.S. PATENT DOCUMENTS 10,917,185 B2  2/2021  Yoon et al.
11,057,131 B2  7/2021  Yoon et al.
(Continued)

FOREIGN PATENT DOCUMENTS

| EP | 3471296 A1 | 4/2019 | |
|---|---|---|---|
| WO | 2018230984 A1 | 12/2018 | |
| WO | WO-2019147381 A1 * | 8/2019 | ........ H04J 11/0073 |

OTHER PUBLICATIONS

Ericsson, "CR for Late drop capabilities", vol. RAN WG2, No. Athens, Greece; Feb. 25, 2018-Mar. 1, 2018, Mar. 8, 2019 (Mar. 8, 2019), 3GPP Draft; R2-190XXXX—CR for Late Drop Capabilities (38.331)_V3, 3rd Generation Partnership Project (3GPP), Mobile Competence Centre ; 650, Route Des Lucioles; F-06921 Sophia-Antipolis Cedex; FRA, pp. 1, 10-20 and 140-180, Retrieved from the Internet: URL:https://www.3gpp.org/ftp/Email_Discussions/RAN2/%5BRAN2%23105%5D/%.
(Continued)

*Primary Examiner* — Christopher R Crompton
(74) *Attorney, Agent, or Firm* — David D. Brush; Westman, Champlin & Koehler, P.A.

(57) ABSTRACT

A communication method implemented by a base station having at least one cell and forming part of a mobile access network including neighbouring cells of the cell. The method includes broadcasting blocks referred to as SSB blocks at a first periodicity value for synchronising a terminal and for allowing said terminal to receive SIBs of which at least one of said SIBs includes an identifier of at least one neighbouring cell, a second periodicity value of SSB blocks
(Continued)

broadcast by said neighbouring cell and a frequency position of an SSB block of said neighbouring cell.

19 Claims, 1 Drawing Sheet

(51) Int. Cl.
*H04W 36/08* (2009.01)
*H04W 48/20* (2009.01)

(58) Field of Classification Search
USPC .......................................................... 370/503
See application file for complete search history.

(56) References Cited

U.S. PATENT DOCUMENTS

| | | | | |
|---|---|---|---|---|
| 2018/0324022 | A1* | 11/2018 | Sheng | H04L 27/2692 |
| 2019/0363809 | A1* | 11/2019 | Yoon | H04W 56/001 |
| 2020/0120622 | A1 | 4/2020 | Yoon et al. | |

OTHER PUBLICATIONS

Huawei et al., "General considerations on UE power saving for NR", vol. Ran WG2, No. Athens, Greece; Feb. 25, 2019-Mar. 1, 2019, Feb. 15, 2019 (Feb. 15, 2019), 3GPP Draft; R2-1900600 General Considerations On UE Power Saving for NR, 3rd Generation Partnership Project (3GPP), Mobile Competence Centre; 650, Route Des Lucioles; F-06921 Sophia-Antipolis Cedex Retrieved from the Internet: URL:http://www.3gpp.org/ftp/tsg%5Fran/WG2%5FRL2/TSGR2%5F105/Docs/R2%.

Huawei et al., "On RRM optimization in frequency domain for UE power saving", vol. RAN WG2, No. Athens, Greece; Feb. 25, 2019-Mar. 1, 2019, Feb. 15, 2019 (Feb. 15, 2019), 3GPP Draft; R2-1900602 On RRM Optimization in Frequency Domain for UE Power Saving, 3rd Generation Partnership Project (3GPP), Mobile Competence Centre; 650, Route Des Lucioles; F-06921 Sophia-Antip Retrieved from the Internet: URL:http://www.3gpp.org/ftp/tsg%5Fran/WG2%5FRL2/TSGR2%5F105/Docs/R2%.

International Search Report dated May 27, 2020 for corresponding International Application No. PCT/FR2020/050462, dated Mar. 6, 2020.

Written Opinion of the International Searching Authority dated May 27, 2020 for corresponding International Application No. PCT/FR2020/050462, filed Mar. 6, 2020.

English translation of the International Search Report dated May 27, 2020 for corresponding International Application No. PCT/FR2020/050462, dated Mar. 6, 2020.

English translation of the Written Opinion of the International Searching Authority dated Jun. 10, 2020 for corresponding International Application No. PCT/FR2020/050462, filed Mar. 6, 2020.

Ericsson, "CR for Late drop capabilities", vol. RAN WG2, No. Athens, Greece; Feb. 25, 2018-Mar. 1, 2018, Mar. 18, 2019 (Mar. 18, 2019), 3GPP Draft; R2-1901553—CR for Late Drop Capabilities (38.331)_V3, 3rd Generation Partnership Project (3GPP), Mobile Competence Centre; 650, Route Des Lucioles; F-06921 Sophia-Antipolis Cedex; FRA, pp. 1-479.

* cited by examiner

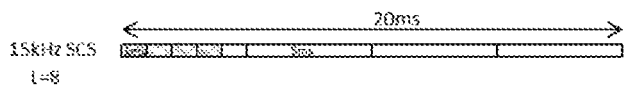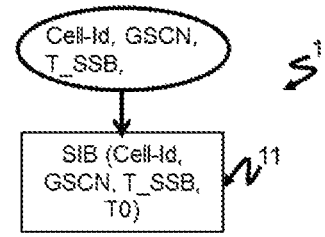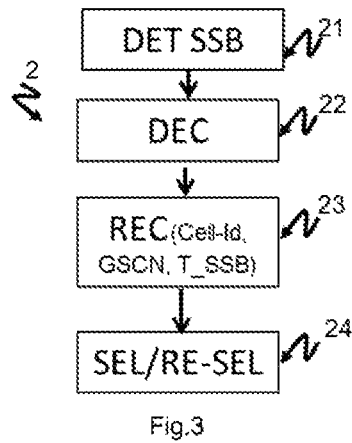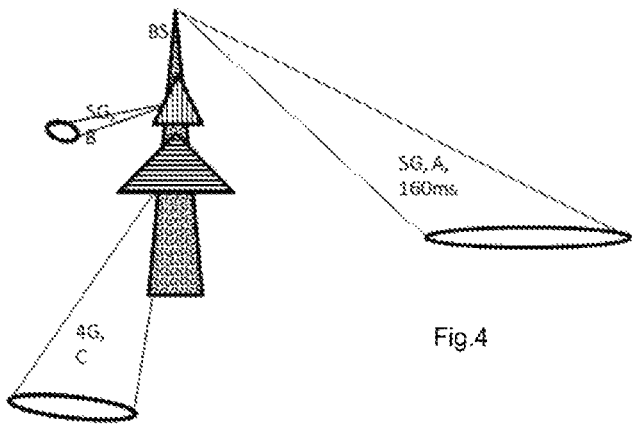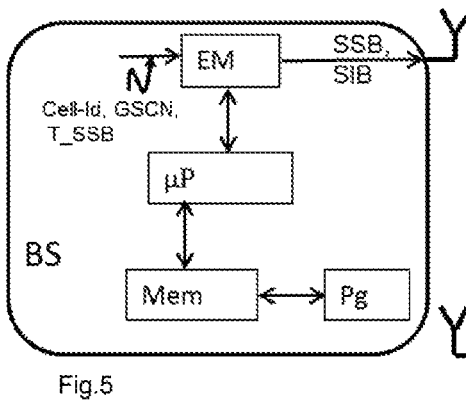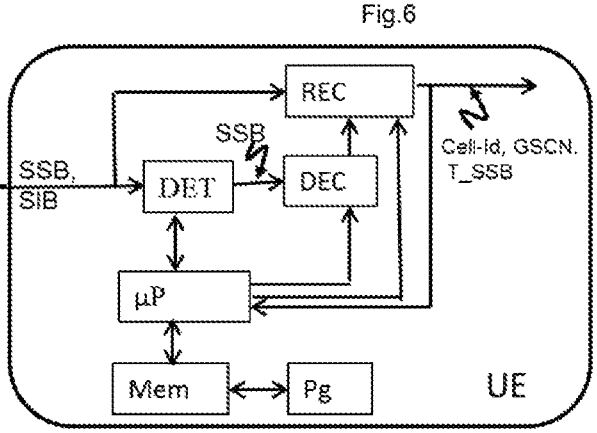

INFORMATION COMMUNICATION METHOD, AND SYSTEM AND DEVICES THEREOF

CROSS-REFERENCE TO RELATED APPLICATIONS

This Application is a Section 371 National Stage Application of International Application No. PCT/FR2020/050462, filed Mar. 6, 2020, which is incorporated by reference in its entirety and published as WO 2020/183096 A1 on Sep. 17, 2020, not in English.

FIELD OF THE INVENTION

The present invention relates to the field of telecommunications. Within this field, the invention more particularly relates to methods for communicating system information relating to the access network. It is in particular applicable to portable telecommunications devices.

PRIOR ART

An access network generally consists of a plurality of base stations which allow user equipment (UE), also referred to as terminals or UE below, to gain access to a telecommunications network and to set up a connection with a view to exchanging data.

With respect to the network, a turned-on terminal is either in idle mode or in connected mode. The idle mode is such that no radio or network resource is allocated to the user equipment. The terminal is not attached to any base station, but is located by the network in a region containing a plurality of cells (registration area). No communication has been set up to transmit data (DATA). Schematically, since a base station may simultaneously possess a plurality of cells, for example when it is equipped with a plurality of directional antennas, a cell represents an area covered by a base station (BS) for a given radio access technology (RAT).

In the context of the work carried out by the 3GPP, which led to version 15 of the so-called 5G standard, two main mechanisms have been defined so that a terminal may select the cell on which it will camp in idle mode: the cell selection mechanism and the cell reselection mechanism.

The selection mechanism is used by a terminal that is not yet camped on a cell. The reselection mechanism is used by a terminal that is already camped on a cell. Reselection may occur on the same radio frequency (RF), the mechanism then being said to be intra-frequency, on different radio frequencies, the mechanism then being said to be inter-frequency, or between different radio access techniques, the mechanism then being said to be inter-RAT.

A terminal is said to be camped on a cell A if it reads the system information broadcast by cell A (which inter alia gives it the configuration of the paging channel of cell A) and if it listens to this paging channel (which is broadcast to all the cells of the registration area) in order to learn of a communication intended for it from cell A. Moreover, following a request from an application layer or following receipt of a notification of a paging message from cell A, a terminal camped on cell A performs an initial access to cell A with a view to setting up a communication.

During implementation of the cell selection or reselection mechanism, the terminal attempts to detect synchronization signals (SS). Synchronization signals (SS) are composed of the primary synchronization signal (PSS) and the secondary synchronization signal (SSS). The detection of SS (PSS and SSS) allows a terminal to synchronize in time and frequency and to decode the physical broadcast channel (PBCH). The PBCH has a given periodicity and occupies time-frequency resources known in advance by the terminal.

In 5G, the PBCH is transmitted conjointly with the synchronization signals (PSS and SSS). In the terminology of the 5G specifications, an SSB block (SS/PBCH block) contains both SS and the PBCH.

For each of the cell selection and cell reselection mechanisms, the terminal must decode the master information block (MIB) contained in the PBCH (which in 5G forms part of an SSB block). The MIB contains the information that the terminal UE requires to be able to receive and decode a certain system information block, SIB1 in LTE and RMSI in 5G (corresponding to SIB1 and SIB2 of LTE), called SIB1 below. SIB1 comprises the identity of the public land mobile network (PLMN) and the identity of the physical cell, Cell-id.

During selection of a cell, the terminal decodes the system information block 1, SIB1, of each detected cell. The terminal then camps on the cell selected via the selection mechanism depending on the information contained in the SIB1 blocks of the detected cells.

During reselection of a cell, the terminal is already camped on a cell. The terminal must decode other system information blocks (SIBs) transmitted by the cell on which it is camped, which have a higher periodicity or which are transmitted on demand (SIBs transmitted on demand), the block SIB1 containing information allowing these other SIBs to be received and decoded.

The so-called 4G LTE specifications do not use the term SSB block. However, LTE uses SS including PSS and SSS and uses PBCH. The transmission of SS and PBCH in LTE follows a pattern the periodicity and frequency location of which are set. The periodicity of the SS is thus 5 ms while the periodicity of the PBCH is 10 ms. For inter-RAT cell reselection between LTE and NR, according to the 4G TS36.331 V15.4.0 specifications, section 6.3.1, System information blocks, a single periodicity value per frequency of the SSBs of the neighboring 5G cells is broadcast via the system information block SIB24. This single value per frequency is denoted "measTimingConfig" in block SIB24. By "frequency", what is meant is "the central frequency of SSBs associated with a cell."

According to the 5G NR specifications, SSB blocks are transmitted according to a certain time-frequency pattern. The pattern is repeated with a certain periodicity selected from a set of determined values: 5, 10, 20, 40, 80 and 160 ms with a default value of 20 ms. FIG. 1 illustrates, for a periodicity of 20 ms, and for two different values of the spacing between SCS sub-carriers, the possible positions of the SSB blocks according to 5G technical specification 38.213. An SSB burst set is confined to a maximum duration of 5 ms every 20 ms and consists of a plurality of SSB blocks, each SSB block being mapped in time onto four OFDM symbols. In FIG. 1 the 1 ms rectangles textured with small dots represent sub-frames containing SSB blocks of a burst set. The flexibility permitted in the 5G NR specifications as regards the choice of the periodicity of the SSB blocks has led the cell reselection mechanism to be adapted to a certain extent, to allow the cell on which the terminal is camped to broadcast, for a given frequency, a value of the periodicity associated with the transmission of the SSBs of neighboring cells. This adaptation is an attempt to cover the case where the transmission periodicity of the SSBs of the neighboring cells is set to a value other than the default value of 20 ms. Thus, according to 3GPP technical specification TS38.331 V15.4.0, section 6.3.1, System information blocks, a single periodicity value of the SSBs is broadcast via system information block SIB2 to aid with intra-frequency cell reselection, and a single periodicity value of the SSBs is broadcast per frequency via system information block SIB4 to aid with inter-frequency cell reselection. For intra-frequency cell reselection, the SSB periodicity value is denoted "smtc" in the block SIB2. For inter-frequency cell reselection, the per-frequency SSB periodicity value is denoted "smtc" in the block SIB4.

Thus, a terminal performing a cell reselection may refer to these values broadcast by the cell on which it is camped, with a view to adapting its synchronization procedure using the single SSB periodicity value broadcast via one of the system information blocks.

The specifications of 5G networks are such that 5G communications should benefit from a throughput one-thousand times higher than the previous generation. This performance is in particular achieved via base-station densification.

An increase in the number of base stations makes techniques for decreasing the power consumption of telecommunications networks more complex. To be able to put certain of these base stations into advanced sleep mode (ASM), the network operator must be able to control the distribution of load between cells in its network. In addition, to increase ASM efficiency of a station, it is in the operator's interest to make the temporal SSB rate as high as possible, i.e. 160 ms, to extend the time in ASM.

To be able to control the load on an operator's access network, it is essential for terminals to camp on the right cells, i.e. those that allow the operator's criteria as regards correct management of its network to be met. During a selection or a reselection, the terminal attempts to detect the energy at the SSB frequency locations specified by the standard in a default window of 20 ms. In the absence of sufficient detected energy, the terminal may conclude that there is no network or that no SSB was transmitted in its measurement window of 20 ms.

It is possible that a terminal may not identify a cell A the SSB periodicity of which is higher than 20 ms if its measurement window of 20 ms does not coincide with a transmission of at least one SSB of cell A. The terminal will in contrast certainly discover a cell B with a periodicity higher than or equal to 20 ms (which ensures that at least one SSB is transmitted in any measurement window of 20 ms) if the terminal is under its coverage. If a cell is not detected, the terminal obviously cannot select it. This risk of non-selection is therefore a serious obstacle to the implementation, by the operator, of ASM with an SSB rate of 160 ms.

Once camped on cell B, the terminal may attempt a cell reselection, for example to find another higher priority cell (the priorities of the various frequencies chosen by the operator are broadcast in the SIBs relating to cell reselection). The terminal may detect with certainty cell A if cell B broadcasts in its SIBs a periodicity value set to 160 ms. As only one periodicity value may be broadcast via the SIBs, this implies that the terminal will have to perform systematic scans with this periodicity, which requires a measurement window of 160 ms, even though other cells may have a higher periodicity and be of interest to the terminal. Specifically, if the terminal is configured with a window of 160 ms, it will have to perform its energy detection for a time of 160 ms to be able to conclude that an eligible cell is not present, this consuming a lot of power and latency.

There is therefore a need for a technique that will allow selection and reselection procedures to be improved.

SUMMARY OF THE INVENTION

The invention provides a communication method implemented by a base station possessing at least one cell, the base station being part of a mobile access network comprising cells neighboring the cell. The method comprises:
broadcasting, at a first periodicity value, so-called SSB blocks intended for the synchronization of a terminal and intended to allow the reception by this terminal of system information blocks, at least one of these system information blocks comprising an identifier of at least one neighboring cell, a second periodicity value of SSB blocks broadcast by this neighboring cell and a frequency location of an SSB block of this neighboring cell.

A further subject of the invention is a communication method implemented by a terminal. The method comprises:
detecting so-called SSB blocks broadcast by a cell at a first periodicity, so that the terminal may synchronize with this cell,
decoding these blocks to obtain information, to be able to receive system information blocks broadcast by the cell, at least one of these system information blocks comprising an identifier of at least one neighboring cell, a second periodicity value of SSB blocks broadcast by this neighboring cell and a frequency location of an SSB block of this neighboring cell,
the terminal selecting this cell.

According to one particular embodiment of the invention, the method implemented by a terminal comprises:
detecting so-called SSB blocks broadcast by a cell at a first periodicity, so that the terminal may synchronize with this cell,
decoding these blocks to obtain information, to be able to receive system information blocks broadcast by the cell, at least one of these system information blocks comprising an identifier of at least one neighboring cell, a second periodicity value of SSB blocks broadcast by this neighboring cell and a frequency location of an SSB block of this neighboring cell,
the terminal reselecting the neighboring cell if this neighboring cell has higher priority.

A further subject of the invention is a mobile terminal able to implement a method according to the invention. The terminal comprises:
a receiver,
a detector for detecting so-called SSB blocks broadcast by a cell with a first periodicity so that the terminal may synchronize with this cell,
a decoder for decoding these blocks to obtain information, to be able to receive, with the receiver, system information blocks broadcast by the cell, at least one of these system information blocks comprising an identifier of at least one neighboring cell, a second periodicity value of SSB blocks broadcast by this neighboring cell and a frequency location of an SSB block of this neighboring cell,
a microprocessor allowing the terminal to select or reselect the neighboring cell if this neighboring cell has higher priority.

A further subject of the invention is a base station able to implement a method according to the invention. The base station comprises:
a transmitter for broadcasting, at a first periodicity value, SSB blocks intended for the synchronization of a terminal and intended to allow the reception by this terminal of system information blocks, at least one of these system information blocks comprising an identifier of at least one neighboring cell, a second periodicity value of SSB blocks broadcast by this neighboring cell and a frequency location of an SSB block of this neighboring cell.

A further subject of the invention is a transmitted or received signalling digital signal comprising so-called SSB blocks that are broadcast at a first periodicity value, that are intended for the synchronization of a terminal and that are intended to allow the reception by this terminal of system information blocks, at least one of these system information blocks comprising an identifier of at least one neighboring cell of a cell, a second periodicity value of SSB blocks broadcast by this neighboring cell and a frequency location of an SSB block of this neighboring cell.

A terminal within the radio coverage of the cell is able to receive the SSB blocks broadcast by this cell. The primary purpose of these SSB blocks is to allow the terminal to synchronize with the cell.

These SSB blocks further allow the terminal to identify a neighboring station with higher priority than the cell, and to search for said station efficiently by providing the terminal with sufficient information, i.e. the identifier of this neighboring cell, the frequency location of an SSB block of this neighboring cell, and the periodicity value of the SSB blocks broadcast by this neighboring cell, in order, in the end, to allow it to be selected or reselected easily. Since the addition of broadcast information has a cost (in terms of time and frequency resources used, and of the power required to manage this information), the amount of information added is limited. Thus, the identifier of a cell, the frequency location of its SSB blocks and the periodicity of its SSB blocks may optionally be added for a second neighboring cell. The addition for other neighboring cells beyond the second is not envisionable for reasons of cost if this addition is to system information block 1, SIB1.

According to one particular embodiment of the invention, the neighboring cells are synchronous with the cell and the at least one of these system information blocks further comprises a time location of the SSB blocks broadcast by this neighboring cell.

In a context of transmission based on a plurality of beams, or based on a single beam (which may be repeated in a plurality of SSBs), SSB blocks are transmitted in bursts (SS burst set) in a certain window (of 5 ms maximum duration for the 3GPP NR specifications; however, the number of frames (system frame number) that may contain the SSB blocks is not specified in the standard). The number L of possible SSB blocks in a burst set depends on the frequency band (band below 3 GHz, L is equal to 4, band between 3 and 6 GHz, L is equal to 8, band between 6 and 53 GHz, L is equal to 64). The set of possible time locations of the SSB blocks in an SS burst set depends on the OFDM numerology, which in most cases is uniquely identified by the frequency band. Knowledge of the time location of the SSB blocks broadcast by the neighboring cell (frame number, location(s) occupied in the frame) thus allows the terminal to position itself exactly at the right time to receive and decode these blocks. Selection or reselection is therefore even more efficient.

According to one particular embodiment of the invention, the at least one of the system information blocks is a so-called SIB1 block and the cell is of 4G or 5G type.

According to one particular embodiment of the invention, the at least one of the system information blocks is a so-called SIB24 block, the cell is of 4G type, and the neighboring cell is of 5G type.

According to one particular embodiment of the invention, the at least one of the system information blocks is a so-called SIB3 block, and the cell and the neighboring cell are of 5G type.

According to one particular embodiment of the invention, the at least one of the system information blocks is a so-called SIB4 block, and the cell and the neighboring cell are of 5G type.

LIST OF THE FIGURES

FIG. 1 is a schematic illustrating, for two different values of the spacing between SCS subcarriers, the broadcast of SSB blocks with a periodicity of 20 ms, FIG. 2 is a flowchart of a communication method according to the invention implemented by a base station, FIG. 3 is a flowchart of a communication method according to the invention implemented by a terminal, FIG. 4 is a schematic of an example of an access network implementing the invention, FIG. 5 is a schematic of the simplified structure of a base station according to the invention able to implement a communication method according to the invention, FIG. 6 is a schematic of the simplified structure of a terminal according to the invention able to implement a communication method according to the invention.

DESCRIPTION OF ONE EMBODIMENT OF THE INVENTION

The general principle of the invention is based on the broadcast, by a cell, of a pointer to a higher priority cell, so that a terminal may select or reselect this higher priority cell even if the latter is broadcasting its SSB blocks with a periodicity higher than the default size of the synchronization window of the terminal.

The pointer contains a plurality of information items: an identifier Cell-Id of a higher priority neighboring cell, called the secondary idle cell, the frequency location GSCN of the SSB blocks of this neighboring cell, and the periodicity value T_SSB of the SSB blocks broadcast by this neighboring cell.

The priority between cells is defined by the operator and is broadcast via the SIBs relating to cell reselection. In a context where the cell and the neighboring cell are synchronized, the pointer may further comprise the time location of the SSB blocks broadcast by this neighboring cell.

Of course, the cell may broadcast a plurality of pointers to a plurality of higher priority neighboring cells. However, the number of pointers is dependent on the cost of the broadcast of these pointers. FIG. 2 shows a flowchart of a communication method according to the invention implemented by a base station. The base station possesses at least one cell. The base station forms part of a mobile access network comprising cells neighboring this cell.

The method 1 comprises broadcasting 11, at a first periodicity value, so-called SSB blocks that are intended for the synchronization of a terminal and that are intended to allow this terminal to receive system information blocks. At least one of these system information blocks comprises an identifier Cell-Id of at least one neighboring cell, a second periodicity value T_SSB of SSB blocks broadcast by this neighboring cell and a frequency location GSCN of an SSB block of this neighboring cell. According to one embodiment, the neighboring cells are synchronous with the cell. In this case, the at least one of these system information blocks further comprises a time location TO of the SSB blocks broadcast by this neighboring cell.

FIG. 3 shows a flowchart of a communication method according to the invention implemented by a terminal. The terminal wants to communicate via an access network. The access network comprises at least one base station with at least one cell. The cell has one or more neighboring cells that belong either to the same base station or to different base stations that may optionally be co-located.

The method 2 implemented by the terminal comprises:
- detecting 21 so-called SSB blocks broadcast by a cell at a first periodicity, so that the terminal may synchronize with this cell,
- decoding 22 these blocks to obtain information, to be able to receive 23 system information blocks broadcast by the cell, at least one of these system information blocks comprising an identifier Cell-Id of at least one neighboring cell, a second periodicity value T_SSB of SSB blocks broadcast by this neighboring cell and a frequency location GSCN of an SSB block of this neighboring cell,
- the terminal selecting 24 the neighboring cell if this neighboring cell has higher priority or the terminal selecting 24 the cell.

According to one exemplary implementation illustrated in FIG. 4, the operator of a telecommunications system has deployed 4G and 5G cells. A first 5G cell operates with a band A and with a broadcast of the SSB blocks with a periodicity higher than the default value of 20 ms, of 160 ms for example. The selection by the operator of a periodicity of 160 ms may be motivated by the desire to implement advanced sleep mode (ASM) in the base station BS with which the 5G cell is associated. Specifically, the higher the periodicity of broadcast of the SSB blocks, the longer and deeper the sleep may be. For example, the IEEE Standards Association has defined three sleep modes with a minimum sleep time of 71 μs, 1 ms and 10 ms, respectively.

A second 5G cell co-located with the first 5G cell operates with a band B and with a broadcast of the SSB blocks with a periodicity equal to the default value of 20 ms. Another co-located cell may be a 4G cell operating in a band C with a broadcast of the SSB blocks with a periodicity equal to the default value of 5 ms.

With respect to the co-located cells, the first 5G cell is the highest priority neighboring cell, i.e. the so-called secondary idle cell.

The terminal UE may initially camp on the second 5G cell in the band B or on the 4G other cell in the band C. The terminal has therefore detected the SSB blocks broadcast by one of these co-located cells and is therefore synchronized with one of these co-located cells. Decoding these SSB blocks allows the terminal to obtain information, with a view to being able to receive system information blocks broadcast by this cell with which it is synchronized.

On receiving these system information blocks SIB, the terminal gains knowledge of the identifier Cell-Id of the first 5G cell, of the value, 160 ms, of the periodicity of the SSB blocks broadcast by this neighboring cell and of the frequency location of an SSB block of this neighboring cell. The identifier Cell-Id corresponds to the physical cell Id of the 3GPP NR specifications. The frequency location of an SSB block is given by the global synchronization channel number (GSCN) in the 3GPP NR specification.

The terminal then adjusts its synchronization window to this value of 160 ms, and positions it frequency wise to reflect the frequency location of an SSB block. Optionally, the terminal also has knowledge, via one of the system information blocks SIB, of the time location of these SSB blocks broadcast by this neighboring cell, this allowing it to position its synchronization window in time. Thus, reliably and with a high success rate, the terminal may detect the SSB blocks of the higher priority neighboring cell and synchronize with this cell, and thus select (if the pointer is in SIB1) or reselect this neighboring cell.

The simplified structure of a base station according to the invention, conforming to a first protocol, 4G or 5G for example, and able to implement a transmission method according to the invention is illustrated in FIG. 5.

The base station BS comprises a microprocessor μP the operation of which is controlled via the execution of a program Pg the instructions of which allow a communication method according to the invention to be implemented, a transmitter EM, and a memory Mem comprising a buffer memory.

On initialization, the code instructions of the program Pg are for example loaded into the buffer memory Mem before being executed by the processor μP. The microprocessor μP drives the transmitter.

The transmitter EM broadcasts the SSB blocks at a first periodicity value. These SSB blocks are intended for the synchronization of a terminal and are intended to allow this terminal to receive system information blocks SIB. The transmitter receives, as input, the identifier Cell-Id of at least one neighboring cell, a second periodicity value T_SSB of SSB blocks broadcast by this neighboring cell, and a frequency location GSCN of an SSB block of this neighboring cell. At least one of the system information blocks SIB comprises the identifier Cell-Id of at least the neighboring cell, the second periodicity value T_SSB of SSB blocks broadcast by this neighboring cell, and the frequency location GSCN of an SSB block of this neighboring cell.

The simplified structure of a terminal according to the invention able to implement a communication method according to the invention is illustrated in FIG. 6.

The terminal UE comprises a microprocessor μP the operation of which is controlled via the execution of a program Pg the instructions of which allow a communication method according to the invention to be implemented, a Mem memory comprising a buffer memory, a detector DET, a decoder DEC, and a receiver REC.

On initialization, the code instructions of the program Pg are for example loaded into the buffer memory Mem before being executed by the microprocessor μP. The microprocessor μP drives the detector DET, the decoder DEC, and the receiver REC.

The detector DET receives as input so-called SSB blocks broadcast by a cell at a first periodicity and system information blocks SIB broadcast by the cell. The detector DET detects the SSB blocks and their detection allows the terminal to synchronize with the cell.

The decoder DEC receives the SSB blocks as input and decodes them to obtain information, with a view to being able to receive, via the receiver REC, system information blocks SIB broadcast by the cell.

The reception by the receiver REC of the system information blocks SIB allows the terminal to gain knowledge of the identifier Cell-Id of at least one neighboring cell, of a second periodicity value T_SSB of the SSB blocks broadcast by this neighboring cell and of a frequency location GSCN of an SSB block of this neighboring cell.

Knowledge of the identifier Cell-Id of at least one neighboring cell, of a second periodicity value T_SSB of the SSB blocks broadcast by this neighboring cell and of a frequency location GSCN of an SSB block of this neighboring cell allows the microprocessor μP to select or reselect this neighboring cell if it has higher priority than the cell.

As a result, the invention also applies to one or more computer programs, in particular a computer program on or in a data medium, suitable for implementing the invention. This program may use any programming language and be in the form of source code, object code or intermediate code between source code and object code, such as in a partially compiled form, or in any other desirable form for implementing a method according to the invention.

The data medium may be any entity or device capable of storing the program. For example, the medium may include a storage means, such as a ROM, for example a CD-ROM or a microelectronic circuit ROM, or else a magnetic recording means, for example a floppy disk or a hard disk.

Moreover, the data medium may be a transmissible medium such as an electrical or optical signal, which may be routed via an electrical or optical cable, by radio or by other means. The program according to the invention may in particular be downloaded from an Internet network.

As an alternative, the data medium may be an integrated circuit into which the program is incorporated, the circuit being designed to execute or to be used in the execution of the method in question.

The invention claimed is:

1. A communication method implemented by a base station possessing at least one cell, the base station being part of a mobile access network comprising cells neighboring the cell, the method comprising:
broadcasting, at a first periodicity value, synchronization signal blocks (SSB blocks) for synchronization of a terminal and to allow reception by this terminal of system information blocks (SIBs), at least one of the system information blocks comprising information allowing the other system information blocks to be received and decoded,
wherein the at least one of the system information blocks further comprises, for at least one neighboring cell, an identifier of the at least one neighboring cell, a second periodicity value of SSB blocks broadcast by the at least one neighboring cell and a frequency location of an SSB block of the at least one neighboring cell.

2. The communication method as claimed in claim 1, wherein the neighboring cells are synchronous with the cell and the at least one of the system information blocks further comprises a time location of the SSB blocks broadcast by the at least one neighboring cell.

3. The communication method as claimed in claim 1, wherein the at least one of the system information blocks is a system information block type 1 (SIB1 block) and the cell is of 4G or 5G type.

4. The communication method as claimed in claim 1, wherein the at least one of the system information blocks is a system information block type 24 (SIB24 block), the cell is of 4G type, and the neighboring cell is of 5G type.

5. The communication method as claimed in claim 1, wherein the at least one of the system information blocks is a system information block type 3 (SIB3 block), and the cell and the neighboring cell are of 5G type.

6. The communication method as claimed in claim 1, wherein the at least one of the system information blocks is a system information block type 4 (SIB4 block), and the cell and the neighboring cell are of 5G type.

7. The communication method as claimed in claim 1 wherein the at least one neighboring cell comprise two neighboring cells and the at least one of the system information blocks comprises for each of the two neighboring cells, an identifier of the neighboring cell, a periodicity value of SSB blocks broadcast by the neighboring cell and a frequency location of an SSB block of the neighboring cell.

8. A communication method implemented by a terminal, which comprises:
detecting synchronization signal blocks (SSB blocks) broadcast by a cell at a first periodicity, so that the terminal may synchronize with the cell,
decoding the SSB blocks to obtain information, to be able to receive system information blocks broadcast by the cell, at least one of the system information blocks comprising information allowing the other system information blocks to be received and decoded, wherein the at least one of the system information blocks further comprises, for at least one neighboring cell, an identifier of the at least one neighboring cell, a second periodicity value of SSB blocks broadcast by the at least one neighboring cell and a frequency location of an SSB block of the at least one neighboring cell, and
the terminal selecting the cell.

9. The communication method as claimed in claim 8, wherein the at least one of the system information blocks is a system information block type 1 (SIB1 block) and the cell is of 4G or 5G type.

10. The communication method as claimed in claim 8, wherein the at least one of the system information blocks is a system information block type 24 (SIB24 block), the cell is of 4G type, and the neighboring cell is of 5G type.

11. The communication method as claimed in claim 8, wherein the at least one of the system information blocks is a system information block type 3 (SIB3 block), and the cell and the neighboring cell are of 5G type.

12. The communication method as claimed in claim 8, wherein the at least one of the system information blocks is a system information block type 4 (SIB4 block), and the cell and the neighboring cell are of 5G type.

13. A communication method implemented by a terminal, which comprises:
detecting synchronization signal blocks (SSB blocks) broadcast by a cell at a first periodicity, so that the terminal may synchronize with the cell,
decoding the SSB blocks to obtain information, to be able to receive system information blocks broadcast by the cell, at least one of the system information blocks comprising information allowing the other system information blocks to be received and decoded, wherein the at least one of the system information blocks further comprises, for at least one neighboring cell, an identifier of the at least one neighboring cell, a second periodicity value of SSB blocks broadcast by the at least one neighboring cell and a frequency location of an SSB block of the at least one neighboring cell,
the terminal reselecting the at least one neighboring cell if the at least one neighboring cell has higher priority.

14. The communication method as claimed in claim 13, wherein the at least one of the system information blocks is a system information block type 1 (SIB1 block) and the cell is of 4G or 5G type.

15. The communication method as claimed in claim 13, wherein the at least one of the system information blocks is a system information block type 24 (SIB24 block), the cell is of 4G type, and the neighboring cell is of 5G type.

16. The communication method as claimed in claim 13, wherein the at least one of the system information blocks is a system information block type 3 (SIB3 block), and the cell and the neighboring cell are of 5G type.

17. The communication method as claimed in claim 13, wherein the at least one of the system information blocks is a system information block type 4 (SIB4 block), and the cell and the neighboring cell are of 5G type.

18. A base station, which comprises:
- a transmitter for broadcasting, at a first periodicity value, synchronization signal blocks (SSB blocks) for synchronization of a terminal and to allow the reception by the terminal of system information blocks, at least one the system information blocks comprising information allowing the other system information blocks to be received and decoded, wherein the at least one of the system information blocks further comprises, for at least one neighboring cell, an identifier of the at least one neighboring cell, a second periodicity value of SSB blocks broadcast by the at least one neighboring cell and a frequency location of an SSB block of the at least one neighboring cell.

19. A mobile terminal, comprising:
- a receiver,
- a detector for detecting synchronization signal blocks (SSB blocks) broadcast by a cell with a first periodicity so that the terminal may synchronize with the cell,
- a decoder for decoding the SSB blocks to obtain information, to be able to receive, with the receiver, system information blocks broadcast by the cell, at least one of the system information blocks comprising information allowing the other system information blocks to be received and decoded, wherein the at least one of the system information blocks further comprises, for at least one neighboring cell, an identifier of the at least one neighboring cell, a second periodicity value of SSB blocks broadcast by the at least one neighboring cell and a frequency location of an SSB block of the at least one neighboring cell,
- a microprocessor allowing the terminal to select or reselect the at least one neighboring cell if the at least one neighboring cell has higher priority.

* * * * *